Dec. 1, 1931.  G. W. GILLE ET AL  1,834,698
GREASE GUN
Filed Dec. 16, 1929
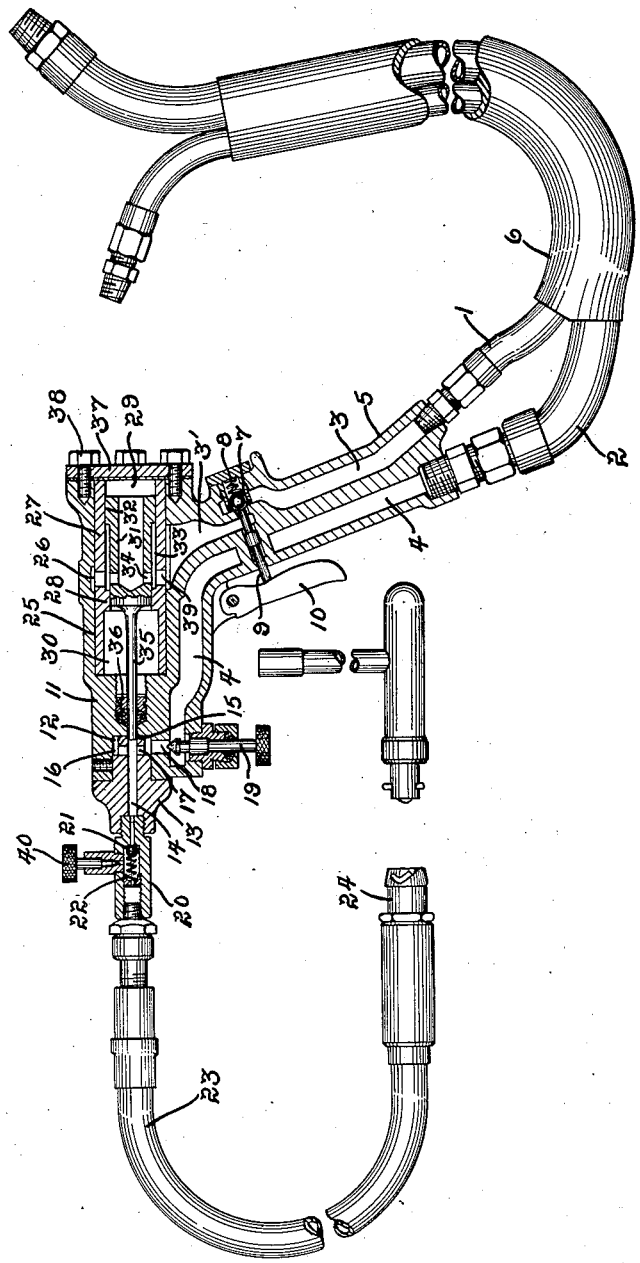
Inventor
George W. Gille
Charles G. Wilson
By Owen & Owen
Attorneys Patented Dec. 1, 1931

1,834,698

UNITED STATES PATENT OFFICE

GEORGE W. GILLE AND CHARLES G. WILSON, OF BRYAN, OHIO, ASSIGNORS, BY MESNE ASSIGNMENTS, TO THE ARO EQUIPMENT CORPORATION, OF BRYAN, OHIO, A CORPORATION OF OHIO

GREASE GUN

Application filed December 16, 1929. Serial No. 414,331.

This invention relates to a method of and apparatus for pumping grease and similar materials where very high pressures are to be exerted on the material. More particularly the invention relates to a method and apparatus for forcing grease into alemite and similar fittings, the forcing power being secured from compressed air such as is available at service stations. The details of the invention will appear as the description proceeds.

In the accompanying drawing forming a part of this specification there is illustrated one form of apparatus embodying the invention. In this apparatus there is indicated an air hose 1 and a grease hose 2 leading into passages 3 and 4 respectively in a handle 5. For convenience the air and grease hose may be enclosed together in a sheath 6. The air hose is adapted to be coupled to a suitable source of air under pressure such as is commonly available at service stations and the grease hose is adapted to be connected with a suitable container for grease.

A ball valve 7 is indicated as normally seated by a spring 8 in an opening connecting passage 3 with a continuation 3' thereof. A push rod 9 is mounted in a position to unseat valve 7 when thrust thereagainst by a trigger 10.

Mounted on handle 5 there is a body portion 11. In the front of this body portion there is a socket 12 in which there is seated a barrel member 13 having therein a cylindrical opening 14. The inner end 15 of member 13 is reduced in diameter so as to leave thereabout a channel 16. Lateral passages 17 through the wall of portion 15 connect the cylindrical opening 14 with the annular passage 16. A passage 18 from annular passage 16 to passage 4 is controlled by a needle valve 19. Member 20 is screwed into the outer end of cylindrical opening 14 and has a small opening therethrough controlled by a ball valve 21 normally seated by spring 22. This member discharges into a hose 23 having thereon a fitting 24 suitable for connection with an alemite fitting. This member may of course be constructed to discharge through a Zirke fitting, or any other receiver of grease under high pressure.

The end of body portion 11 opposite from socket 12 is provided with a cylindrical socket 25 in axial alinement with socket 12, but of greater diameter. Midway of socket 25 there is provided an annular enlargement 26, which leaves a channel surrounding a sleeve 27 fitted within the socket. Sleeve 27 is provided with an internal shoulder 28, dividing the interior of the sleeve into two cylindrical portions 29 and 30.

Sliding within shoulder 28 there is a plunger member 31 having on its end within cylinder 29 a shoulder 32 fitting the interior of that cylinder. There is thus left within the cylinder 29 and between shoulders 28 and 32 an annular space 33, which is connected to the hollow interior of member 31 by passages 34, when the parts are in position in which they are shown on the drawing.

Extending forward from member 31 there is a plunger rod 35 the end of which fits snugly within cylindrical opening 14. Packing 36 is provided about piston rod 35 between chamber 30 and cylindrical opening 14.

Sleeve 27 may be held in place within socket 25 by means of a plate 37 secured in position by fastening devices 38. Channel 33 is connected by passage 39 to an annular passage formed by enlargement 26 of socket 25 and this annular passage opens out into continuation 3' of passage 3.

The operation of the device is as follows. With the parts assembled as indicated in the drawing, but with fitting 24 properly in place and with the air hose and grease hose connected respectively to a source of air under pressure and a supply of grease, trigger 10 is operated to unseat valve 7 and admit compressed air through passage 3'. The compressed air thereupon passes into the annular passage formed by enlargement 26 and through openings 39 into annular channel 33 and from thence through openings 34 and the hollow interior of member 31 into the right end of chamber 29, as shown on the drawing. The pressure so exerted drives member 31 and plunger 35 to the left as shown on the drawing. As the plunger moves to the left it passes passages 17 and thereafter drives grease before it through valve 21.

It will be seen that when member 31 moves to the left the openings 34 first pass within shoulder 28, thereby shutting off the communication from the source of compressed air to chamber 29, but the compressed air in that chamber continues to move the piston and plunger to the left until openings 34 pass shoulder 28 and open into chamber 30, which is connected at a point not shown to an exhaust passage. Thereupon the pressure within chamber 29 is relieved and the compressed air in annular passage 33 between shoulders 28 and 32 is sufficient to drive the piston and plunger back to the right, whereupon the openings 34 once more pass shoulder 28 and are in position to receive compressed air, and the operation is repeated.

In order to obtain the best results, it is necessary to have the parts so proportioned and sufficient pressure applied so as to move piston rod 35 to the right and form a partial vacuum within channel 14. Ordinarily air under at least 100 lbs. per square inch is available at service stations, so that proportions operable at that pressure are suitable. It is also necessary for the best results, to adjust needle valve 19 so that the grease admitted past the needle valve and into channel 14 during the time that ports 17 are uncovered will not entirely fill passage 14. In this way when plunger 35 starts to the left the passage in front of it is only partially filled and the plunger moves for a distance before meeting the full resistance of the grease which is exerted when passage 14 is filled. As a result, the plunger and connecting piston 31 acquires momentum before it is necessary to unseat valve 21 and force grease therethrough. In other words, the piston and plunger, instead of exerting a steady push upon the grease, meets it on its movement to the left, as shown in the drawing. The plunger exerts a blow at the end of its movement to the left. As a result of thus proportioning the parts to the air pressure and controlling the inlet of grease into the pump chamber, it is possible to build up pressure as a result of successive blows very much higher than would be the pressure of a steady push upon plunger 35 by compressed air available within chamber 29.

It will be readily understood that in practical operation the reciprocation of piston 31 and plunger 35 is extremely rapid, so that the grease is discharged in a substantially continuous column, in spite of the fact that the force is applied by successive blows instead of by successive pushes. The degree to which pressure is built up by the momentum of piston 31 and plunger 35, in proportion to the air pressure available, in any given grease gun of this construction, is evidently dependent upon the adjustment of needle valve 19. If the needle valve is open sufficiently wide so that grease fills passage 14 during the time that plunger 35 uncovers ports 17, only the pressure of the air in chamber 29 on piston 31 is available, the total pressure on the grease being proportioned to the air pressure as piston 31 is proportioned to plunger 35, less friction. As needle valve is partially closed, plunger 35 is allowed to obtain more and more momentum on its movement to the left before encountering the solid column of grease. In this way the pressure available for extruding grease is many times greater than that which would be obtained by a steady push from plunger 35.

The same method may be used to build up pressure on other materials besides grease, but it is evident that for the most efficient use of this method, the material acted upon should be substantially incompressible, so that the plunger meets comparatively little resistance until the chamber ahead of it is filled solidly, whereupon the blow is delivered upon a compact driving column of material.

The distance to which the momentum of the plunger and piston move the plunger before it is stopped depends upon the resistance encountered, the strokes being shorter as resistance is increased. In any case, the piston is stopped, by resistance of the grease and the compressed air in chamber 33, before the piston or plunger reaches the end of the stroke allowable by the mechanical construction. Likewise on the return stroke, the distance the piston travels to the right is limited by compressed air entering through ports 39. The distance the piston travels after ports 39 begin to open varies with the air pressure, the momentum of the piston etc., but is never great enough for the piston to encounter the end of the cylinder. As will be seen from an inspection of the drawing, ports 16 are uncovered by the withdrawal of plunger 35 at substantially the same time that ports 34 pass shoulder 28, so that the admission of grease is automatically varied with the stroke of the piston, which in turn varies with the resistance encountered. Thus, where high resistance is encountered, but little grease is hammered past valve 21 at each blow of the plunger, and correspondingly little grease is admitted at each stroke. This automatic adjustment is desirable, but where it is necessary to drive the plunger a fixed distance each time, the inlet may be adjusted so as to admit only the amount which can be discharged against the highest counterpressure which is anticipated.

A relief valve 40 may be provided for relieving the pressure whenever desired for any reason.

While there are some features of the apparatus which are believed to be novel and important, it will be readily understood that the shape and arrangement of parts may be widely varied and still accomplish the same method of building up pressure on the grease; and while it is more convenient for the primary purpose of this invention to use air pressure, as that is readily available, at most places where it is desired to extrude grease under pressure, it will be readily understood that similar results might be obtained by reciprocating plunger 35 by other means than air pressure, provided the speed of reciprocation and the grease inlet are so proportioned as to take advantage of the momentum of the plunger in building up the pressure above that which will stall the operating device if the pump cylinder is full of grease at the time the extruding movement of the plunger is started. Therefore, considerable departure from the disclosed apparatus and variations in the exact method within the scope of the appended claims may utilize at least some of the advantages of this invention.

What is claimed is:

1. A grease pump, comprising a cylinder having an outlet at one end controlled by a check valve and an inlet opening through its side adjacent to its other end, means to adjustably restrict the effective size of said inlet, a plunger entering the inlet end of the cylinder and adapted to cover and close said inlet opening when moved into the cylinder, means to reciprocate the plunger, said means consisting of a pneumatic motor, said motor comprising a cylinder, a hollow piston rod connected to the plunger and extending through one end of the pneumatic cylinder, a piston on said rod within the cylinder, the hollow in the rod opening through the piston and being closed at the other end except for lateral openings, which openings are in position to be reciprocated through the end of the cylinder, and means for introducing compressed air into the cylinder on the sides of the piston towards said end of the cylinder.

2. A grease pump, comprising a cylinder having an outlet at one end controlled by a check valve and an inlet opening through its side adjacent to its other end, means to adjustably restrict the effective size of said inlet, a plunger entering the inlet end of the cylinder and adapted to cover and close said inlet opening when moved into the cylinder, means to reciprocate the plunger, said means consisting of a pneumatic motor, said motor comprising a cylinder, a hollow piston rod connected to and in line with the plunger and extending through one end of the pneumatic cylinder, a piston on said rod within the pneumatic cylinder, the hollow in the rod opening through the piston and being closed at the other end except for lateral openings, which openings are in position to be reciprocated through the end of the pneumatic cylinder, and means for introducing compressed air into the cylinder on the side of the piston towards the pump, the lateral openings through the hollow piston rod being spaced from the working end of the plunger a distance substantially equal to the distance between the inlet opening into the pump chamber and the end of the pneumatic cylinder cavity nearest to the pump.

In testimony whereof we have hereunto signed our names to this specificaiton.

C. G. WILSON.
GEORGE W. GILLE.